Jan. 18, 1955  N. C. SCHLEGEL  2,699,582
WINDLACE STRUCTURE AND METHOD OF MAKING THE SAME
Filed March 22, 1951  2 Sheets-Sheet 1
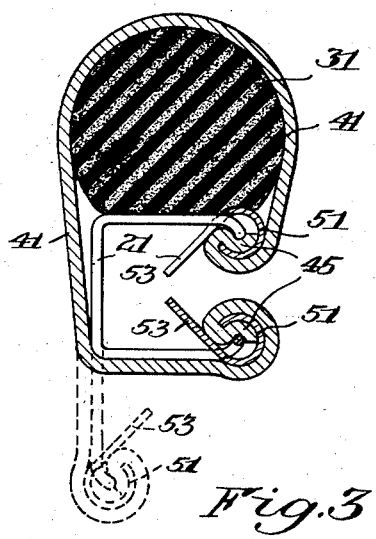
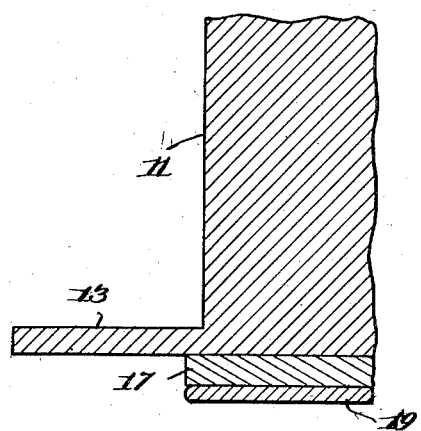
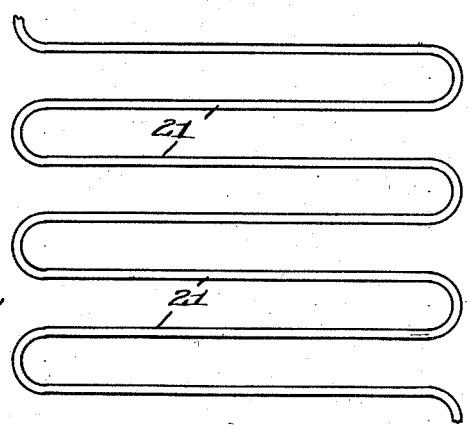
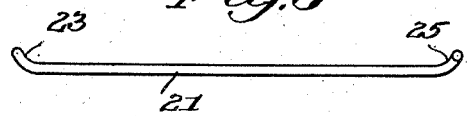
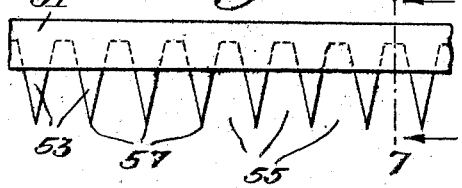
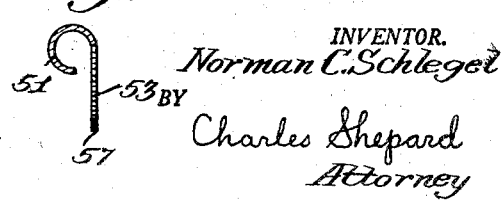
INVENTOR.
Norman C. Schlegel
BY Charles Shepard
Attorney Jan. 18, 1955  N. C. SCHLEGEL  2,699,582
WINDLACE STRUCTURE AND METHOD OF MAKING THE SAME
Filed March 22, 1951  2 Sheets-Sheet 2

INVENTOR.
Norman C. Schlegel
BY Charles Shepard
Attorney

United States Patent Office 2,699,582
Patented Jan. 18, 1955

2,699,582

WINDLACE STRUCTURE AND METHOD OF MAKING THE SAME

Norman C. Schlegel, Rochester, N. Y., assignor to The Schlegel Manufacturing Company, Rochester, N. Y., a corporation of New York Application March 22, 1951, Serial No. 216,991

20 Claims. (Cl. 20—69)

The present invention relates to a quick attachable windlace construction adapted especially, although not exclusively, to the trimming of motor vehicle bodies in such manner as to exclude drafts and dirt at the joints around the edges of the doors.

To be wholly satisfactory a windlace structure, under modern conditions of mass production of automobile bodies, should fulfill many different requirements, including the following requirements of major importance:

1. It should provide a good tight seal between the body and the door, when the door is closed.
2. It should have a long service life; in other words, it should continue to provide a good tight seal even after several years of use.
3. It should provide an attractive appearance.
4. The windlace should be so designed and constructed that it may be applied easily and quickly to the automobile body without the use of tools of any kind and without requiring special fastening means such as screws or rivets.
5. It should also be so designed and constructed as to conform to the curvatures customarily found at the corners of the door opening of the automobile body.
6. In spite of the lack of screws, rivets, or other special fastening means of that kind, the windlace structure should stay put permanently once it has been applied to the automobile body, without any substantial likelihood of becoming accidentally detached or displaced.
7. It should be so designed and constructed as to be capable of being manufactured easily and economically.

Many prior forms of windlace or weather stripping construction are known, the art being an old one, and there are many known structures which fulfill some or even several of the foregoing requirements. However, so far as applicant is now aware, there is no prior structure which fulfills all of the above requirements to a satisfactory degree, save only the present applicant's structure disclosed in his pending United States patent application, Serial No. 206,356, filed Jauary 17, 1951. In the construction there disclosed, the preferred form of windlace includes a body of sheet material, preferably sheet metal, parts of which serve as retaining prongs to hold the windlace structure on a mounting flange.

An object of the present invention is the provision of a satisfactory and efficient windlace construction fulfilling the above requirements and at the same time eliminating any necessity for a main body of sheet metal or other relatively stiff sheet material.

Still another object is the provision of a windlace structure having adequate provision for retaining the structure on a mounting flange even though there is no main stiffening body of sheet material.

Still another object is the provision of a structure in which the main stiffening body is formed of a relatively open or reticulated material such as wires fabricated into predetermined relationship.

A further object is the provision of a structure having relatively stiff beads at its edges, serving the dual purpose of holding the fabric to the other parts of the structure and holding the structure as a whole on the mounting flange.

These and other desirable objects may be attained in the manner disclosed as an illustrative embodiment of the invention in the following description and in the accompanying drawings forming a part hereof, in which:

Fig. 1 is a transverse section through a windlace in accordance with a preferred embodiment of the present invention;

Fig. 2 is a transverse section through a body post of an automobile, of the type to which the windlace is to be applied;

Fig. 3 is a transverse section through the windlace and body post and a fragment of the door, showing the parts in normal assembled position with the door closed;

Fig. 4 is a face view of one form of stiffening member constituting part of the windlace construction, in a preliminary stage of manufacture;

Fig. 5 is an end view of the structure shown in Fig. 4;

Fig. 6 is a side view of a bead member used in the preferred form of the present construction, shown separately from the rest of the structure;

Fig. 7 is a transverse section taken substantially on the line 7—7 of Fig. 6;

The same reference numerals throughout the several views indicate the same parts.

Figure 8:
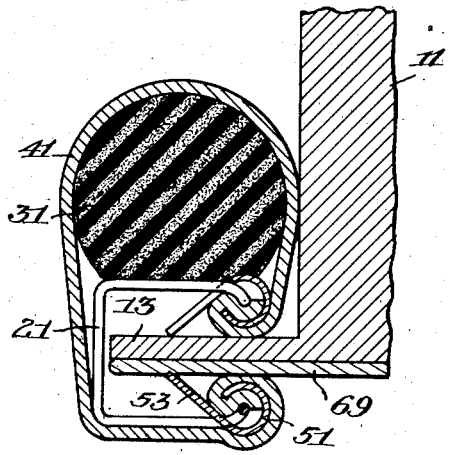
Fig. 8 is a view similar to a portion of Fig. 3 showing the same windlace structure applied to a modified body construction.

Referring first to Fig. 2, there is shown at 11 a fixed part of a motor vehicle body of conventional construction, this part being adjacent the opening edge of the door of the vehicle and constituting, in effect, the door frame, commonly referred to as the body post. The exact construction of the post itself is subject to variations, as well understood in the art, the form here shown being merely illustrative of the general type of body post with which the windlace of the present invention is to be used. The body post includes a flange 13 parallel to the plane of the door when the door is closed. In some prior constructions, the free edge of the flange 13 has been folded or doubled back upon itself to provide a thickened edge to retain a windlace or weather strip in place. The windlace of the present invention may be used on such a doubled-back flange, if desired, but it is one of the features of the present invention that the windlace will stay in place on a simple flange of uniform thickness, so that the doubled-back edge is not required. A trim panel 17 having a cloth or leather facing 19 is customarily attached to the inner face of the body post and other parts of the automobile body structure, to form the interior finish of the body.

Referring now to Fig. 1 of the drawings, the windlace in its preferred form comprises a stiffening body of generally U-shaped cross section, to be applied over the body flange 13 and to embrace it between the legs or side walls of the stiffening body, in combination with an elongated rod-like resilient body or mass supported from the above mentioned stiffening body, the resilient body or mass being highly compressible and providing a yielding sealing contact with the vehicle door when the latter is closed. The resilient body and the stiffening body are combined with each other in such a way and have such details as to fulfill, to a feasible and practical extent, all of the various requirements above mentioned.

Referring now to Figs. 1, 4, and 5 of the drawings, the stiffening body in its preferred form is made principally or entirely of relatively stiff filaments such as metal wires 21 extending back and forth in a multiplicity of passes or reaches across the width of the body strip, these passes or reaches preferably but not necessarily being approximately parallel to each other and spaced a considerable distance from each other in a direction lengthwise of the strip, except at their ends where they are looped to connect successive passes with each other as seen in Fig. 4. The connecting loops at the ends of the passes 21 are turned up at an angle to each other as shown at 23 in Fig. 5, in order to anchor more firmly the bead which runs along the edge of the stiffening body, as will be described below in greater detail.

Running lengthwise along the exterior surface of one of the side legs of the U-shaped stiffening body 21, is the resilient filling 31 of some soft and readily compressible material, such for example as a strip of sponge rubber. This resilient strip 31 may be of any suitable cross section, for example, square or otherwise polygonally formed, but preferably, for the purpose of economical manufacture and easy assembly, the resilient body 31 is in the form of a rod of circular cross section when it is initially formed, and it has a diameter roughly equal to but preferably a little more than the width of one side leg of the stiffening body 21, as well seen in Fig. 1.

A strip of flexible sheet material 41, such for example as a strip of woven textile material, is fastened at one edge to the free edge of the stiffening body 21 which is adjacent to the resilient body 31; thence extends tightly around the exposed part of the periphery of the resilient body 31 as seen in Fig. 1; thence extends across the outside surface of the base portion of the U-shaped stiffening body 21 (that is, the portion which connects the two parallel side walls to each other); and thence extends across the exterior surface of the second side wall of the stiffening body 21, and has the second edge of the textile strip firmly fastened to the second free edge of the stiffening body. The flexible strip 41 is preferably applied against and clamped to the rest of the structure under sufficient transverse tension so that it exerts a compressive force on the enclosed resilient body 31, thus somewhat distorting the resilient body from its initial cross section, to flatten one side of the resilient body (if it is not already flattened during manufacture) where the resilient body presses against the stiffening structure 21. This flattening of a resilient body originally of circular cross section is plainly seen in Fig. 1.

To promote this desired transverse tension in the flexible sheet material 41, the stiffening body 21 is preferably originally formed in an L-shaped cross section rather than a U-shaped cross section, and the resilient body 31 and flexible strip 41 are fastened to the stiffening body 21 while it is still in this L-shaped cross section as indicated by dotted lines in Fig. 1. Then, after completion of clamping of the flexible strip 41, the stiffening body 21 is given its final fold or bend from the L-shaped form shown in dotted lines in Fig. 1, to the final U-shape form. This bending or folding will produce a still further pull or tightening on the flexible sheet 41.

In the preferred construction, the edges of the flexible sheet 41 are clamped to the stiffening body 21 by means of clamping members in the form of beads, which beads serve also the additional purpose of acting as retaining members for holding the completed structure on the mounting flange 13 of the body post 11. One of the beads is separately shown in Figs. 6 and 7, and in its preferred form it is made of a sheet of relatively stiff and somewhat resilient sheet material such, for example, as sheet metal. One edge of the sheet is bent to almost circular form as shown at 51, but with a slight opening at one point of the circumference of the circle to form a split tube. The rest of the stiff sheet material extends approximately tangentially from one edge of this opening, as indicated at 53, this portion 53 being notched as at 55 to provide a series of relatively sharp pointed ends 57 between the notches 55.

These beads are applied to the stiffening body 21 in the positions shown in Figs. 1 and 3, wherein the pointed teeth 53, 57 extend through the spaces between the transverse wires 21 of the stiffening body, the wires themselves being received in the notches 55 of the bead. The circular or tubular part 51 of the bead wraps around the bent edge portion 23 of the stiffening body, thereby being firmly retained on the edge of the U-shaped stiffening body, and the tubular portion 51 of the bead encloses and firmly clamps the marginal edge 45 of the textile fabric or other flexible sheet material 41. As will be well understood from Fig. 1, the flexible strip 41 extends around the outer surface of the tubular portion 51 of the bead, thence is folded at its extreme edge along the free edge of the tubular part 51 and extends a short distance into the interior of the tubular part 51 of the bead, and is tightly clamped therein, against the looped ends of the stiffening wires 21. The pointed ends 53, 57 on the bead extend obliquely toward each other and toward the base wall of the U-shaped stiffening body, as shown.

This structure may be easily and quickly mounted on the mounting flange 13 of the vehicle body post 11, simply by manually moving the windlace structure onto the flange with the flange inserted between the two beads 51, and into the space between the pointed portions 53, 57 of those beads. In other words, the windlace is moved rightwardly, when viewed as in Figs. 1 and 2, toward and onto the mounting flange 13, so that it becomes mounted thereon as shown in Fig. 3, with the points 53, 57 sprung resiliently away from each other by the thickness of the interposed flange 13, and with the sharp pointed ends 57 digging into the opposite surfaces of the flange 13 to prevent removal of the windlace from the mounting flange by any reasonable or normal force.

When the windlace is applied to the mounting flange 13, during the trimming of the automobile body, simple hand pressure is all that is required to place the windlace in proper position on the mounting flange, no tools being needed if the windlace has previously been cut to the required lengths to go around the perimeter of each door opening. Initially, the points 57 of the two beads will be somewhat closer to each other than the thickness of the mounting flange 13. But as the windlace is thrust home on the flange, the points 57 will be separated far enough to receive the mounting flange between them, this separation of the points being accomplished partly by flexing the somewhat resilient material of which each bead itself is made, and partly by flexing the somewhat resilient stiffening wires 21 to spring the side legs of the U-shaped stiffening body slightly away from each other. The resilience of all these parts will constantly tend to dig the sharp points of the beads into the surfaces of the mounting flange 13, thus adequately holding the windlace in position on the flange.

The door opening of the vehicle body customarily has curves at its upper corners, rather than abrupt angles. The stiffening body 21 may be readily bent around these curves, simply by hand pressure, when the windlace construction is being applied to the mounting flange.

When the door 61 (Fig. 3) associated with this windlace is closed, a surface or ledge on the door approximately parallel with the mounting flange 13 comes into contact with the adjacent surface of the windlace and compresses this surface somewhat, as plainly seen in Fig. 3, providing a tight seal along the windlace, to exclude drafts and dirt.

Fig. 8 illustrates the same windlace construction as applied to a slightly different form of mounting flange. Here, the mounting flange, instead of consisting merely of the metal flange layer 13, includes also a trim panel 69 (similar to the panel 19) which extends to the extreme edge of the flange 13 and which, like the flange 13, is embraced by the legs of the windlace stiffening element. The sharp points 57 of the windlace structure will normally dig into the soft trim panel 69 to a greater extent than they will dig into the surface of the metal mounting flange 13, which feature is illustrated in Fig. 8. But even on a relatively smooth metal surface, the sharp points 57 will normally dig into the metal mounting flange sufficiently to resist all normal displacing forces.

Figure 9:
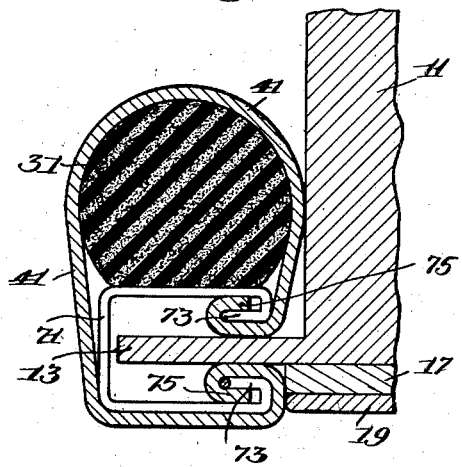
Fig. 9 is a view similar to a portion of Fig. 3, showing a modified form of windlace structure.

In Fig. 9 there is shown a slightly modified form of windlace construction. Here, the clamping beads and their sharp pointed retaining portions are entirely omitted. The stiffening body, here made of wire indicated at 71, has its marginal loops doubled back upon themselves as at 73, thus tightly clamping the marginal edges 75 of the flexible facing 41 between these back-turned or inturned portions 73 and the inner faces of the side legs of the stiffening body, all as will be readily understood from Fig. 9 in view of the foregoing description.

This modified structure shown in Fig. 9 is not held on the mounting flange 13 with quite the same degree of firmness and rigidity as when the beads and their retaining prongs are employed. However, in many cases the frictional retention of the structure shown in Fig. 9 is sufficient for practical purposes. The stiffening body 71 is preferably initially formed with the side walls or legs thereof converging toward each other rather than parallel, so that considerable force must be exerted to separate them to an approximately parallel condition in which the flange 13 may be inserted between them. Thus considerable lateral frictional pressure is exerted on opposite faces of the flange 13 by this structure when it is placed on the flange, producing sufficient holding power. If a higher degree of holding power is required, the flange 13 can be doubled back upon itself at its outer edge, or otherwise formed with its outer edge thicker than the part which contacts with the edges of the windlace.

Except in the above mentioned particulars of omitting the bead and clamping the flexible facing 41 by the inturned ends of the loops of the wire body, the construction in Fig. 9 may otherwise be the same as that previously described in connection with Figs. 1–8.

Figure 10:
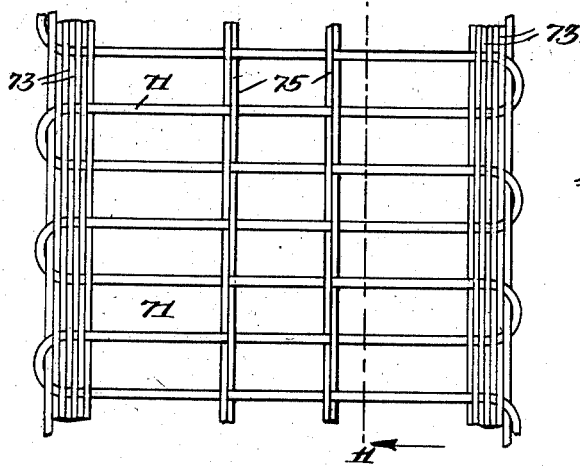
Fig. 10 is a view similar to Fig. 4 showing a modified construction of the stiffening member.
Figure 11:
Fig. 11 is a section taken approximately on the line 11—11 of Fig. 10.

Referring now to Figs. 10 and 11, there is here shown a modified form of construction of the stiffening body, this modified structure being applicable for use either with the edge beads as in Figs. 1–8 or in the alternative edge construction shown in Fig. 9. The stiffening member in Figs. 10–11 is formed, as before, of wires 71 looped back and forth in a direction transversely to the length of the windlace, in exactly the same manner as the wires 21 in Fig. 4. But whereas in Fig. 4, these wire loops 21 constitute, in effect, weft strands only without any longitudinal or warp strands, the alternative construction shown in Figs. 10–11 includes also warp strands indicated diagrammatically at 73 and 75. The strands 73 extend along the selvage edge of the structure, while the strands 75, spaced considerably inwardly from the strands 73, are at or approximately at the locations where the structure is bent along longitudinal lines to form the U-shaped channel. In other words, the warp strands 75 are conveniently at approximately the base corners of the channel when the wire is bent into its final channel form.

The strands 73 and 75 may be of any convenient or suitable material, preferably of non-metallic textile thread such as cotton, but may be made of wire if greater stiffness or strength is required. For somewhat greater flexibility in bending the structures around corners of the door opening, the intermediate strands 75 may in some instances be omitted entirely, using only the selvage edge warp strands 73.

Figure 12:
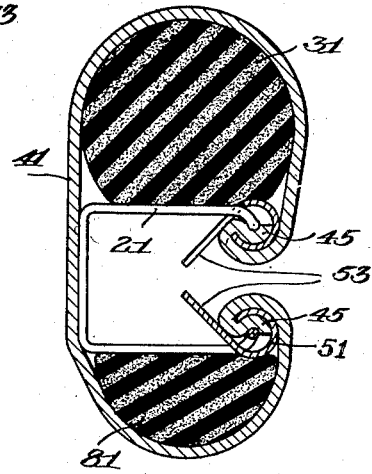
Fig. 12 is a view similar to Fig. 1, showing another modification of the structure.

In Fig. 12 there is shown another modification of the construction. Here, there is a second elongated rod-like resilient and compressible body 81 (e. g., of sponge rubber) extending longitudinally along the outer surface of the second leg or side wall of the U-shaped stiffening body 21, in addition to the first resilient and compressible body 31 extending along the outer surface of the first leg or side wall of the U-shaped stiffening body 21. The body 81 may be of the same construction as the body 31, except that the body 81 is of a different and preferably smaller cross section. For example, the member 81 may conveniently be of approximately semi-circular or "half round" cross section and of approximately the same diameter as the member 31 which is of approximately circular cross section. In this modified construction, the strip 41 of flexible sheet material (e. g., textile fabric) envelops or covers both of the cushion strips 31 and 81, and serves to hold both of them in place on the outer surfaces of the respective side walls or legs of the U-shaped stiffening body. Except for the use of this second resilient and compressible strip 81, this modified structure of Fig. 12 may otherwise be the same as the structure illustrated in Fig. 1; or, indeed, any of the other modifications previously disclosed may be constructed with the second resilient and compressible member 81, if desired.

This modification, using two cushion strips of substantially different thicknesses, is particularly useful when the windlace is to be applied to vehicle bodies having unintentional manufacturing variations of substantial extent. When, for example, the door 61 closes to a predetermined standard relation to the windlace mounting flange 13, the windlace may be applied to the mounting flange with the full thickness cushion strip 31 faced toward the door. But when trimming a vehicle body in which the sealing surface of the door 61 comes closer to the mounting flange 13 (due to unavoidable manufacturing inaccuracies or variations), then the windlace is applied to the mounting flange in a reverse position, with the thinner cushion strip 81 faced toward the door, rather than the thicker cushion strip 31. In either position, the extra cushion strip (81 or 31, as the case may be) which is faced away from the door, simply forms a decorative bead or rib of pleasing appearance, and does not in any way detract from the utility of the article.

In all of the constructions specifically illustrated, the flexible sheet 41 completely covers and encloses the stiffening wires 21, the cushion strip or strips, and the clamping beads 51 (if used); in short, the flexible strip 41 covers all other parts which might be considered of less attractive appearance. Thus by making the strip 41 of a good grade of attractive material (e. g., a textile material with or without a face pattern woven therein) an article of very attractive appearance may be provided, with no exposed metal parts or other unattractive exposed parts. Although the selvage edges of the flexible strip 41 are preferably fastened by the bead 51, as in Figs. 1 and 3, or by the means shown in Fig. 9, it is possible to fold the selvage edges of the strip 41 back upon themselves around the edges of the stiffening frame 21, and cement the two layers of the fold to each other. The prongs 53 and bead 51 may still be used over the folded selvage edge, if desired.

This windlace or weather stripping construction is capable of many uses, particularly but not exclusively around the door openings of the motor vehicles, using this latter term in a broad sense as including trucks, automobiles, aircraft, motorboats, etc.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A windlace structure including an elongated stiffening body of generally U-shaped cross section for embracing a mounting flange, said body including a multiplicity of transverse reaches of stiffening filaments whose central portions are substantially spaced from each other in a direction longitudinally of said elongated body, at least one elongated rod-like cushioning strip of highly compressible material extending along the outside of a side wall of said U-shaped body, and a masking and retaining strip of flexible sheet material having its marginal edges fastened to the marginal edges of said U-shaped body and extending tightly around the outside of said U-shaped body and over each cushioning strip to cover the cushioning strip and to hold it firmly against the outer face of said U-shaped stiffening body.

2. A structure as defined in claim 1, in which said stiffening filaments are metallic wires.

3. A structure as defined in claim 1, in which said stiffening filaments are portions of a metallic wire looped back and forth to constitute reaches extending transversely to the length of said U-shaped stiffening body.

4. A structure as defined in claim 1, in which said marginal edges of said masking and retaining strip are clamped to said marginal edges of said U-shaped stiffening body by clamping members separate from said stiffening body.

5. A structure as defined in claim 4, in which said clamping members are formed with retaining portions extending obliquely toward the central plane of said U-shaped body for engagement with a mounting flange embraced by said U-shaped body.

6. A structure as defined in claim 5, in which said retaining portions are in the form of prongs spaced from each other and extending inwardly through the spaces between said stiffening filaments of said U-shaped body.

7. A structure as defined in claim 6, in which said prongs have sharp points at their inner ends, to tend to dig into the mounting flange embraced by said U-shaped body.

8. A windlace structure including an elongated stiffening body of generally U-shaped cross section for embracing a mounting flange, said body including a multiplicity of transverse reaches of stiffening filaments whose central portions are substantially spaced from each other in a direction longitudinally of said elongated body, an elongated strip of compressible and resilient material mounted on and extending along an exterior surface of said U-shaped body, and a retaining member mounted on one edge of said U-shaped body and having a series of teeth extending through the spaces between the stiffening filaments of said U-shaped body and obliquely inwardly toward the central plane of said U-shaped body for engagement with a mounting flange embraced by said U-shaped body.

9. A structure as defined in claim 8, in which said retaining member is formed of sheet metal having a split tubular portion embracing one edge of said U-shaped body and a series of retaining teeth extending approximately tangentially with respect to said split tubular portion.

10. A structure as defined in claim 9, in which the marginal edge of said U-shaped body embraced within said split tubular portion is turned at an angle to the adjacent side wall of said U-shaped body in order to retain said split tubular portion more firmly thereon.

11. A structure as defined in claim 10, further including a second elongated strip of compressible and resilient material extending along a different exterior surface of said U-shaped body from the surface on which the first mentioned compressible strip is located, said second compressible strip being of substantially different thickness from said first mentioned compressible strip.

12. A structure as defined in claim 1, in which two elongated cushioning strips extend respectively along the outside surfaces of the two side walls of said U-shaped stiffening body.

13. A structure as defined in claim 12, in which said two cushioning strips are of substantially different thickness in directions perpendicular to the side wall surfaces on which they are respectively mounted.

14. The method of making a windlace which includes the steps of forming an elongated stiffening body of approximately L-shaped cross section, placing an elongated cushioning strip of resilient compressible material along the outer surface of the first leg of said L-shaped body, placing a covering strip of flexible sheet material over the outer surfaces of said L-shaped body in covering and enclosing relation to said cushioning strip, fastening the marginal edges of said flexible sheet material tightly to the marginal edges of said L-shaped stiffening body, and thereafter bending the second leg of said L-shaped body to transform said L-shaped body into an approximately U-shaped body and thereby to tighten said strip of flexible sheet material about the cushioning strip causing the latter to be uniformly compressed and permanently maintained in such compressed state.

15. The method as defined in claim 14, wherein said fastening of the marginal edges of said flexible sheet material to the marginal edges of said stiffening body is accomplished by clamping a split tube over the adjacent marginal edges of both said sheet material and stiffening body.

16. The method of making a windlace which includes the steps of forming an elongated stiffening body of approximately L-shaped cross section with a multiplicity of reaches of stiffening wires extending transversely and spaced from each other longitudinally of said elongated body, placing an elongated strip of resilient compressible material along the outer surface of the first leg of said L-shaped body, placing a covering strip of flexible sheet material over said strip of resilient compressible material and over the outer surfaces of said L-shaped body, fastening each marginal edge of said flexible sheet material tightly to the adjacent marginal edge of said stiffening body by clamping on the adjacent marginal edges a clamping member having prongs extending obliquely through the spaces between said stiffening wires, and bending the second leg of said L-shaped body to transform said L-shaped body into an approximately U-shaped body with said prongs extending obliquely therein in position to engage a mounting flange positioned between the side walls of the U-shaped body.

17. A windlace including a body of generally U-shaped cross section, a first resilient compressible cushioning strip of substantial thickness extending along the exterior surface of one side wall of said body, a second resilient compressible cushioning strip of substantially greater thickness extending along the exterior surface of the opposite side wall of said body, and a flexible covering sheet having its marginal edges secured to the marginal edges of said side walls of said body, said sheet extending around the exterior of said body in overlying and embracing relation to said cushioning strips to hold said cushioning strips in place on said body.

18. A structure as defined in claim 17, in which said first cushioning strip is of approximately semicircular cross section with its flat side faced toward said body.

19. A structure as defined in claim 18, in which said second cushioning strip is of approximately circular cross section.

20. The method of making a windlace which includes the steps of forming an elongated stiffening body, placing an elongated cushioning strip of resilient compressible material along a side area of said body, placing a covering strip of flexible sheet material over the outer surfaces of said body in covering and enclosing relation to said cushioning strip, fastening the marginal edges of said flexible sheet material tightly to the marginal edges of the stiffening body and thereafter bending said stiffening body transversely into a substantially U-shaped form and thereby tightening said strip of flexible sheet material about the cushioning strip causing the latter to be uniformly compressed and permanently maintained in such compressed state of increased expanding potential.

References Cited in the file of this patent

UNITED STATES PATENTS

| | | |
|---|---|---|
| 2,344,575 | Warren | Mar. 21, 1944 |
| 2,378,888 | Clark | June 19, 1945 |
| 2,386,018 | Watter | Oct. 2, 1945 |
| 2,443,959 | Merrill | June 22, 1948 |
| 2,475,112 | Stanitz | July 5, 1949 |
| 2,554,452 | Bright | May 22, 1951 |
| 2,602,202 | Orr | July 8, 1952 |